United States Patent Office 3,536,475
Patented Oct. 27, 1970

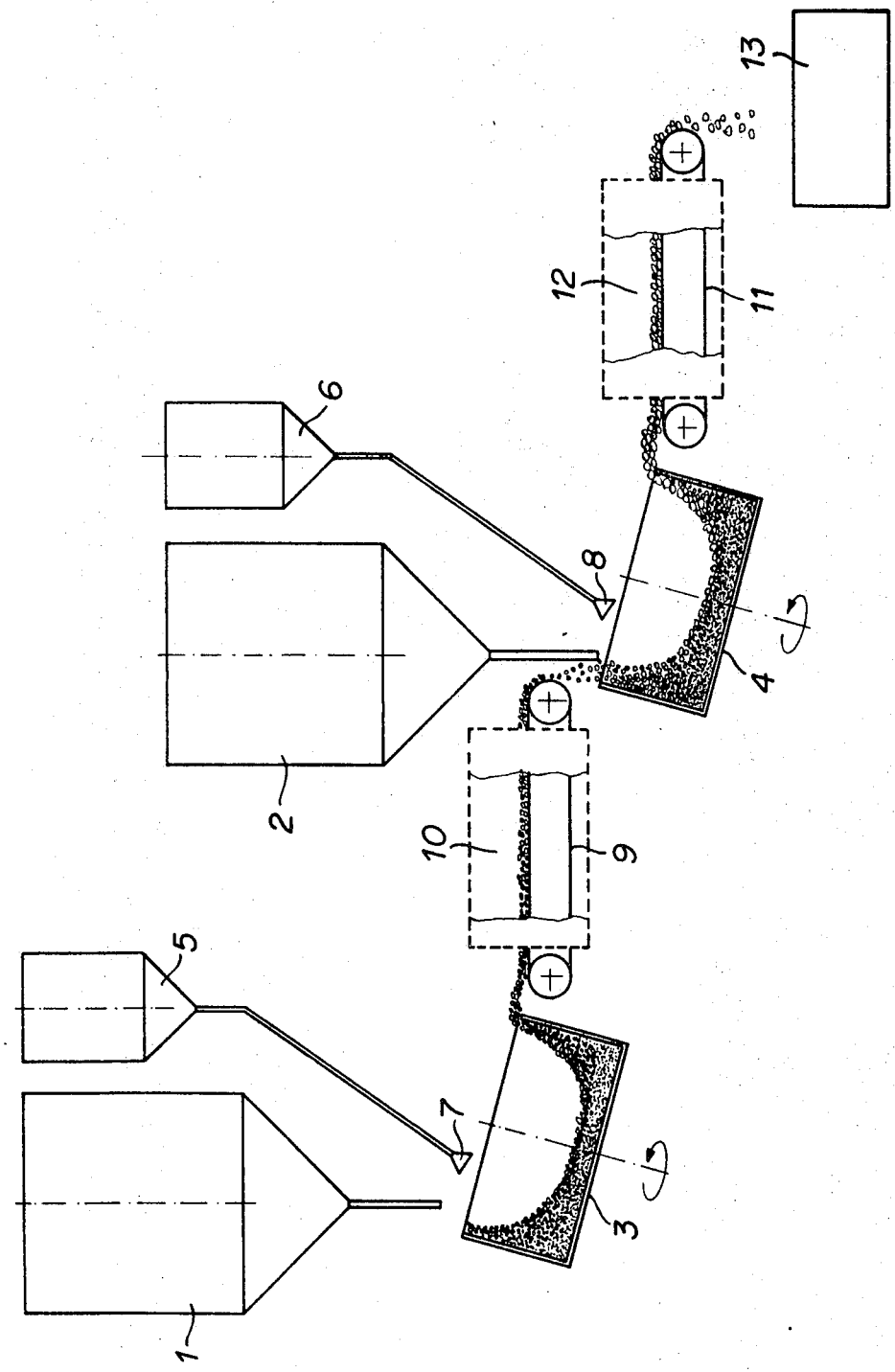

3,536,475
METHOD OF MAKING PELLETS FROM A FINELY DIVIDED SOLID MATERIAL
Jean Trub, Carouge, Switzerland, assignor to Battelle Memorial Institute, International Division, Carouge/Geneva, Switzerland
Filed Nov. 17, 1967, Ser. No. 684,037
Int. Cl. B01j 2/12; C22b 1/14
U.S. Cl. 75—3                                    5 Claims

ABSTRACT OF THE DISCLOSURE

In a method of making pellets from a finely divided solid material by wetting the finely divided material with an aqueous solution of a colloidal inorganic binder, the steps of forming small nodules of the mixture and partially drying the nodules, rolling the nodules on a rotating bed of the mixture to cause the nodules to grow in size, and repeating the drying and rolling steps until pellets of desired size are formed and prolonging the final drying.

---

This invention relates to a method of making pellets from a finely divided solid material, in particular porous pellets of iron ore which are capable of being reduced without smelting.

The many known methods of producing iron ore pellets essentially comprise two successive operations. The first operation is a pelletization operation which consists in forming, from iron ore fines, damp pellets having a diameter of, for instance, about 1 cm., by rolling moistened fines in an apparatus having a rotating surface, such as a disc or a pelletizing drum. The second operation consists in hardening these pellets by calcining them in a suitable kiln.

Since the moist pellets resulting from the first operation are very crumbly, it has been proposed, in some instances, to make them harder with a binder, e.g. starch or sodium silicate, added thereto in small quantities. The addition of the binder is carried out either by mixing it with the moist fines from which the pellets are made, or by coating the latter with the binder prior to subjecting them to the heat hardening operation. In the first case, the centrifugal force tends to drive the binder, together with the water, towards the periphery of the pellets being formed. Thus, the addition of the binder results, in both of the above-mentioned cases, solely in the formation of a peripheral layer having a high concentration of binder which, once hardened, only renders this peripheral region of the pellets harder, while their interior still remains of low resistance.

Thus, in the known methods of making iron ore pellets, it is essential to carry out the separate heat hardening operation in order to provide the pellets with sufficient mechanical strength to enable them to withstand handling, transport and crushing during subsequent reduction, e.g. in a blast-furnace. As is known, hardening by calcination involves costly installations and high heating costs. Moreover, in iron ore pellets produced by the above-mentioned methods wherein a binder is used, the hardened peripheral layer which results from the high concentration of binder near the surface of the pellets is very much less porous than the interior thereof. These hardened peripheral layers hinder the flow of gases through the pellets during subsequent reduction and thus reduce the effectiveness of this operation.

An object of the present invention is to eliminate the above-mentioned drawbacks of the known methods by providing a method of making porous pellets of high mechanical strength without having to resort to any heat hardening treatments.

The method according to the invention comprises preparing an agglomeratable mixture by wetting the finely divided material with an aqueous solution of a colloidal, inorganic, binder, the amount of solution being at least 1% by weight of the finely divided material in the dry state; forming small nodules from this mixture; partially and progressively drying these small nodules, in the presence of a binder hardening agent, for a short period of time so as to cause hardening of the binder at the periphery of the nodules to form a thin barrier capable of decreasing to major extent the escape of binder from the nodules; rolling the nodules on a rotating bed of said agglomeratable mixture to cause them to grow in size; partially and progressively drying the enlarged nodules, in the presence of said hardening agent, for a short period of time so as to cause hardening of the binder and to form a further thin barrier at the periphery of the enlarged nodules; repeating the nodule rolling operation on a rotating bed of the agglomerate mixture and the subsequent drying operation as many times as is necessary to produce, in successive stages, pellets of desired size; and prolonging the last drying and hardening operation to dry said pellets fully to set the binder contained therein.

This method thus essentially consists in using an aqueous solution of a suitable colloidal, inorganic, binder to wet the finely divided solid material with which it is desired to make the pellets thereby to produce an agglomeratable mixture, in carrying out the agglomeration of this mixture in a plurality of successive stages each followed by a peripheral drying and hardening opeartion so as to produce, in the form of a succession of concentric layers, pellets of the required size, and in carrying out complete drying of these pellets and setting of the binder contained therein. Thus, as a result of the peripheral drying and hardening operation which is carried on the pellets after each agglomeration stage, the binder solution is retained in said succession of layers. Consequently, upon final drying and setting, the binder is distributed both within the interior of the pellets and at the periphery thereof. The method according to the invention thus makes it possible to produce homogeneous pellets which are uniformly consolidated due to the presence of the binder and which, at the same time, are highly porous. This is of considerable advantage, in particular in the case of ore pellets, e.g. iron ore pellets, as these pellets can readily be reduced by heating, without smelting, in the presence of a suitable reducing gas. It thus becomes possible to reduce and to refine the metal without having to resort to large installations such as blast-furnaces.

The single figure of the accompanying drawing diagrammatically illustrates apparatus for carrying out the method according to the invention.

Referring to the drawing, agglomeration takes place in two successive stages. The finely divided solid material it is desired to agglomerate, e.g. iron ore, is fed continuously and in controlled quantities from two hoppers 1 and 2 into two agglomerators 3 and 4, each having a rotating table, of a conventional type also known as a "granulating table." The finely divided material is continuously wetted by means of an aqueous solution of an inorganic, colloidal, binder, e.g. an aqueous solution of sodium silicate, which is stored in tanks 5 and 6 and which is fed, in controlled quantities also, by means of sprinklers 7 and 8 into the agglomerators 3 and 4 respectively.

The amount of solution which is added by means of the sprinklers 7 and 8 must be at least 1% by weight of the finely divided material in the dry state. The amount as well as the water content of this solution are so chosen that the resultant mixture contains just enough liquid for agglomeration to occur. This will be the case with a solution of a sodium silicate and/or a sodium aluminate when the concentration of the binder in the solution is between 30 and 55% by weight.

As is known, rotation of the tables of the agglomerators 3 and 4 causes the finely divided material to spread thereover to form rotating beds and this rotation moreover causes the binder solution intimately to mix with this material. The first agglomerator 3 serves to form relatively small moist nodules which are conveyed by a conveyor belt 9 through a drying chamber 10 wherein they are exposed to a stream of air for a short period of time before being fed into the second agglomerator 4. This travel through chamber 10 serves to dry and to harden a relatively thin peripheral layer of the small nodules so as to form therein a thin barrier intended to limit the escape of the aqueous solution, under the action of centrifugal force, from the interior of the nodules while subsequently being rolled in agglomerator 4. The small nodules thus consolidated at their periphery act as seeds for the second agglomeration stage. In agglomerator 4, these seeds roll on a rotating bed of the said agglomeratable mixture and are made to grow until pellets of the required size are obtained. At the outlet of agglomerator 4 is provided a second conveyor belt 11 to convey the pellets through a second air drying chamber 12 which serves to dry them thoroughly and to ensure setting of the binder they contain. The pellets are then collected in a container 13 which could form part of an installation intended for subsequent treatments, e.g. reduction.

Although not essential, the drying air flowing through chambers 10 and 12 could be heated, e.g. between 80 and 100° C., and possibly charged with $CO_2$, in order to accelerate drying, on the one hand, and setting of the binder, on the other hand. The temperature of the air as also the amount thereof must however be limited in order to ensure progressive, i.e. not abrupt, drying of the nodules or pellets and to avoid bursting thereof. They must moreover be so selected that the drying speed be adapted to that of agglomeration.

In order to simplify the explanation, only two agglomeration stages have been described and illustrated, but clearly the number of these stages and of the intermediate drying operations can vary from case to case, in particular in dependence on the size of the pellets it is desired to produce and on the agglomeration properties of the finely divided material.

The forming of the nodules and their growth can be achieved with any suitable agglomerator. Thus, use could for instance be made of an extrusion device for the first, nodule forming, stage and either drums or rotating tables for the subsequent agglomeration stages.

The fact that the method according to the present invention is carried out without substantial heating of the material to be agglomerated and that the uniform distribution of the binder in the pellets that are produced imparts to the later good mechanical strength, enables this method to be applied to the agglomeration of many finely divided materials of widely differing natures.

In the case of iron ore, it is possible with the present method equally to agglomerate magnetities and haematites as also mixtures of these two materials. Moreover, it is also possible with the present method either to maintain the same state of oxidation of the ore during agglomeration or to carry out agglomeration in a reducing medium in order to bring about at least partial reduction of the ore.

The uniform porosity of the pellets made by the method according to the invention enables reducing agents to have easy access to the interior of these pellets thereby facilitating subsequent reduction, in particular in the case of iron. This results in a notable reduction of the amount of reducing agents needed to produce the metal. Further, this reduction can be achieved with a relatively simple installation such as a trough kiln wherein the pellets are made to come into contact with a reducing agent such as hydrogen or carbon monoxide, while being heated, for example to 700° C. in the case of iron ore. The pellets that have undergone reduction can then directly be melted in a suitable furnace, e.g. an electric arc furnace, and it will be clear that the reduction kiln and the melting furnace could form constituents parts of a common installation for producing refined metal from ore fines.

When it is not intended immediately to melt the reduced pellets, it then becomes necessary to prevent rapid re-oxidation by air. To this end, the pellets could, for instance, be compressed into billets to decrease the area of the reduced metal which is exposed to air.

Additional substances can, if desired, be relatively easily incorporated in the pellets, these substances being for instance added in the form of a powder to the moist mixture which is used for agglomeration purposes in one or more or even all of the successive agglomeration stages. Thus, for instance, in particular in the case of iron ore, coal fines could readily be incorporated in the pellets in order to facilitate their subsequent reduction, i.e. to render them self-reducing. During agglomeration, scorifying substances could also be added to the pellets to facilitate subsequent reduction. To this end, lime ($CaO$) and/or magnesium oxide ($MgO$) can be used to facilitate the refining of iron, ie.. to render the pellets self-melting.

What is claimed is:

1. In a method of making pellets from a finely divided solid material in which an agglomeratable mixture is prepared by wetting the finely divided material with an aqueous solution of a colloidal inorganic hardenable binder, the amount of solution being at least 1% by weight of the finely divided material in the dry state and thereafter the agglomeratable mixture is formed into nodules the improvement comprising the steps of:
    (a) Rolling the nodules on a rotating bed of said agglomeratable mixture to cause them to grow in size.
    (b) Partially and progressively drying the enlarged nodules at a temperature below 100° C. in the presence of a binder hardening agent to cause hardening of the binder at the periphery of the enlarged nodules to form a thin barrier capable of inhibiting escape of binder from the nodules.
    (c) Repeating steps (a) and (b) alternately to produce in successive stages pellets of desired size and
    (d) Porolonging the last drying and hardening step of the resulting pellets to dry said pellets fully and to set the binder contained therein.

2. A method according to claim 1, wherein said binder is of a sodium silicate or sodium aluminate.

3. A method according to claim 2, wherein the content of said binder in said aqueous solution lies between 30 and 55% by weight.

4. A method according to claim 1, wherein the drying operations are carried out by means of a hot gas containing at least one hardening agent for said binder.

5. A method according to claim 4, wherein said hardening agent is carbon dioxide.

References Cited

UNITED STATES PATENTS

| | | | |
|---|---|---|---|
| 3,140,326 | 7/1964 | Erck et al. | 23—313 X |
| 3,205,063 | 9/1965 | Franklin et al. | 75—3 |
| 3,333,951 | 8/1967 | Ban | 75—3 |

OTHER REFERENCES

Klinefetter, T. A., "U.S. Department of Interior Report of Investigations No. 3846"; January 1946, Bureau of Mines.

OSCAR R. VERTIZ, Primary Examiner

G. O. PETERS, Assistant Examiner

U.S. Cl. X.R.

23—313; 264—117

Dedication 3,536,475.—*Jean Trub,* Carouge, Switzerland. METHOD OF MAKING PELLETS FROM A FINELY DIVIDED SOLID MATERIAL. Patent dated Oct. 27, 1970. Dedication filed Mar. 26, 1984, by the assignee, *Battelle Memorial Institute.*

Hereby dedicates to the People of the United States the entire remaining term of said patent.

[*Official Gazette June 19, 1984.*]